March 6, 1956   W. D. MACGEORGE   2,737,641
FOLLOW UP SYSTEM USING A HEAT MOTOR FOR REBALANCE
Filed March 13, 1953
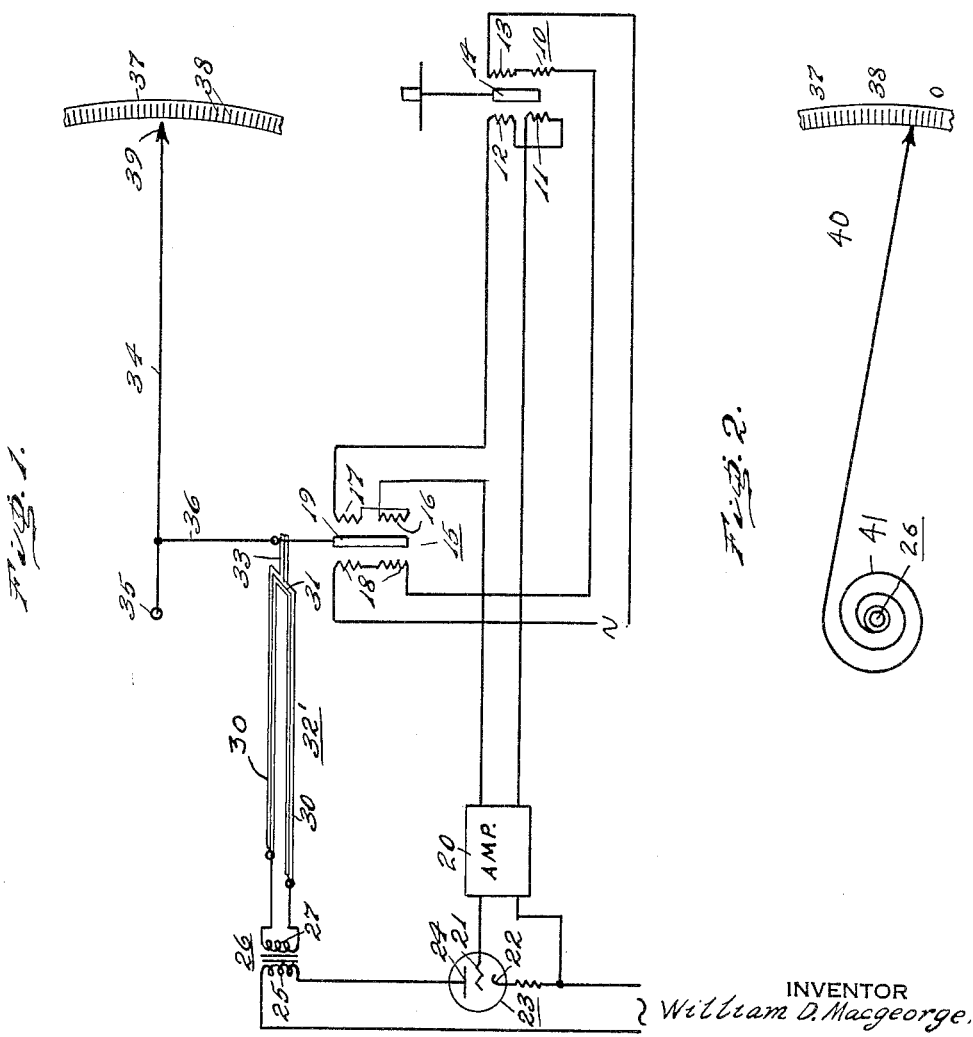
INVENTOR
William D. Macgeorge,
BY
Frank H. Borden
ATTORNEY.

2,737,641

FOLLOW UP SYSTEM USING A HEAT MOTOR FOR REBALANCE

William D. Macgeorge, Lansdale, Pa., assignor to Automatic Temperature Control Co., Inc., Philadelphia, Pa., a corporation of Pennsylvania Application March 13, 1953, Serial No. 342,086

1 Claim. (Cl. 340—187)

This invention relates to control systems, and particularly to telemetering systems utilizing a simplified and economical motor organization.

Systems of this type have been well developed in the prior art, as exemplified, for instance, by the patent to Hornfeck, No. 2,420,539, in which a transmitter incorporating a differential transformer has a relatively movable armature responsive to changes in condition of a given variable, the output of which transformer, of one phase or the opposite, depending upon the sense of unbalance, is bucked against the output of a receiver differential transformer, the armature of which is adjusted by motions of a motor running as a function of unbalance between the outputs of the transmitter differential transformer and the receiver differential transformer. With such telemetering systems the unbalance between the outputs of the transmitter and the receiver cause the running of a two-phase motor in the proper sense as to reestablish balance in the secondaries circuit from the differential transformers.

Such telemetering systems are very efficient and accurate, but due to the expense of the conventional two-phase motor used, are much more expensive than is necessary for certain rudimentary and non-critical uses thereof.

It is among the objects of this invention to improve telemetering systems; to provide a cheap and efficient telemetering system utilizing differential transformers in the transmitter and receivers; to provide a cheap and efficient motor for association in a telemetering circuit and system; and to provide other objects and advantages as will appear as the description proceeds.

In the accompanying drawings, Fig. 1 represents a schematic diagram of the system according to a preferred embodiment of the invention; and Fig. 2 represents a fragmentary detail of a modification thereof.

The invention in a basic form comprises a transmitter differential transformer 10, having secondaries 11 and 12, and a primary 13, with an armature 14 movable axially of the coils 11 and 12, in response to changes in any given device of variable condition with which it is associated. As is characteristic of such differential transformers, the organization is such that the output of the secondaries of the transformer is a resultant of bucking outputs, so that with the armature substantially centered, the opposing outputs are of equal amplitude although of opposite phase and are mutually cancelling so that the secondaries output is substantially null. Motion of the armature from the null position in one direction develops an output of linearly increasing amplitude and of given phase, with, of course, motion in the other sense developing an output of linearly increasing amplitude of the opposite phase. While within the scope of the invention any type of differential transformer may be used, it is preferred to use the transformer of applicant's Patent No. 2,568,587. As noted, this comprises the transmitter of the system emitting a signal with change of the given condition, whether temperature, pressure, rate of flow, liquid level, or position of a part of an apparatus.

A receiver differential transformer 15 is provided, the secondaries 16 and 17 of which are possessed of bucking outputs and are in a circuit with the secondaries 11 and 12 of the transmitter differential transformer. The circuit is preferably one in which the resultant output of the secondaries of one transformer is bucked against the resultant output of the secondaries of the other transformer. The primaries 18 of the receiver transformer are preferably in a series circuit with the primary 13 of the transmitter transformer for coupling to a source of A. C.

The illustrative loop circuit of the secondaries feeds into an amplifier 20, the output of which is of one phase or the opposite phase feeding the grid 21 and cathode 22 of a simple three element tube 23. The anode circuit is from one side of a source of A. C., to the cathode, and from the anode 24 through the primary 25 of a transformer 26, and back to the other side of the A. C. line. The secondary 27 of transformer 26 is in a series loop circuit with the legs 30 and cross connection 31 of a bimetallic strip 32 comprising a motor. The bimetallic motor includes an extension 33 from the lower surface of which an armature 19 of the receiver differential transformer 15 is supported. An indicator arm 34 is provided on a fixed pivot 35 at one end above the motor 32, and by a link 36 connects to the upper part of the extension 33. The free end 39 of the indicator arm sweeps a vertical chart 37 bearing indicia scale markings 38. If desired, it may mount a pen for marking on a movable chart.

In operation let it be assumed that the signals from the respective differential transformer secondaries are instantaneously both null, or that the resultant of the coupled outputs of the secondaries of both transformers is null, or substantially null. Let it be assumed that there is a change in condition effecting a shifting of the armature 14 of the transmitter relative to the stator formed of the coils of the differential transformer. This will be accompanied by a change in the output of the transmitter secondaries so that a resultant signal of one or the opposite phase is bucked against the momentarily fixed output of the receiver differential transformer with a resultant signal to the amplifier and from the amplifier to the grid of the tube 23. The amplifier will contain any necessary phasing devices and the like to the end that the phase of the signal from the secondaries circuit is in phase, or 180° out of phase with the plate voltage on the tube 23.

Depending upon the sense of relative change of the variable, the half cycles on the grid of the tube will be negative when the anode is positive so that there is no flow through the primary 25 of transformer 26, or will be positive on the grid when positive on the anode so that a pulsed anode circuit flows through the primary and induces a voltage in the secondary 27 of transformer 26, which flows through the resistance formed by the bimetallic legs 30, which heats, and by reason of its bimetallic functioning moves the end piece 31 and its extension 33, which effects an angular change in the attitude of the pointer or indicator arm 34, moving the free end 39 thereof relative to the scale 37, and, synchronously moving the armature 19 of the receiver transformer so as progressively to reduce the system unbalance and ultimately to reestablish null balance of no signal to the amplifier. As the grid is then not energized the current flow through the transformer stops as does the flow of heating current through the bimetallic motor, which starts to cool off. This progressively moves the end of the bimetallic strip, repositioning the indicator arm and the armature 19. It will be seen that the system is continuously hunting, with a motor running functionally with the sense of system unbalance.

This effects a very economical system, avoids the use of the more or less heavy and expensive two-phase motors of the prior systems, and is perfectly adapted to a useable degree of accuracy, and to long distances between the active components of the system without adverse effects on the accuracy or functioning of the system.

It will be seen that the use of the pointer and linkage effects a magnification of the motion of the free end of the bimetallic element, without adding such load thereto as to affect its accuracy. However, it will be clear that this is not essential to the functioning of the system, as the extension or the end 40 of the bimetallic element may move directly relative to a chart or graph, as indicated in Fig. 2. Further, it will be understood that although a generally planar bimetallic element is shown, this is purely illustrative as curved elements 41 may also be used in the nature of coiled bimetallic strips, as also indicated in Fig. 2. It will be evident also that the end of the pointer arm or the bimetallic element itself, as noted, may mount a scribing pen or the like for making permanent records on a chart.

Having thus described my invention, I claim:

In A. C. telemetering systems, a transmitter and a receiver differential transformer each comprising a primary winding, a pair of secondary coils and a movable armature producing with relative movement a secondaries output of the instant transformer variable between substantial null and an output of a given or an opposite phase and of increasing amplitude as it departs from null, said transmitter armature being positionable according to variations in the condition of an associated variable, a multi-element tube, connections for an A. C. supply for said primary windings, and connections for an A. C. supply of plate voltage for said tube, a power transformer comprising a primary and a secondary of which the primary is in the plate voltage output of said tube, circuit means connecting the secondaries of the respective differential transformers and said tube, said circuit means being responsive to differences in the outputs of the respective pairs of secondary coils to apply an unbalance signal on said tube, said signal being of one phase or the opposite phase depending upon the sense of unbalance and of amplitude proportional to the degree of unbalance between the respective pairs of coils, said signal being related in phase to said plate voltage as to cause the tube to conduct with one sense of unbalance and to substantially preclude conduction by the tube with the other sense of unbalance, a motor comprising a cross connection and two conducting legs of which at least one leg is of bimetallic material, said legs being in series loop with the secondary of said power transformer, means connecting the armature of said receiver transformer for movement with the cross connection, whereby with an unbalance signal of one phase on the tube the tube conducts and energizes the power transformer to place a voltage from the secondary thereof on said motor which heats and moves the receiver armature in a direction to nullify said signal of said one phase, and whereby with no signal or with a signal of opposite phase the motor cools and moves the armature toward establishment of a signal of said one phase or toward nullification of said signal of opposite phase, in an on-off hunting control.

References Cited in the file of this patent

UNITED STATES PATENTS

| | | |
|---|---|---|
| 2,064,163 | Ileman | Dec. 15, 1936 |
| 2,144,589 | Rich | Jan. 17, 1939 |
| 2,205,637 | Smulski | June 25, 1940 |
| 2,420,539 | Hornfeck | May 13, 1947 |
| 2,560,651 | Kutzler | July 27, 1951 |